(12) United States Patent
Chen

(10) Patent No.: US 8,180,166 B2
(45) Date of Patent: May 15, 2012

(54) TRANSCODING METHOD

(75) Inventor: Ping-Yi Chen, Changhua (TW)

(73) Assignee: Mediatek Inc., Hsin-Chu (TW)

( * ) Notice: Subject to any disclaimer, the term of this patent is extended or adjusted under 35 U.S.C. 154(b) by 904 days.

(21) Appl. No.: 12/235,749

(22) Filed: Sep. 23, 2008

(65) Prior Publication Data

US 2010/0074544 A1 Mar. 25, 2010

(51) Int. Cl.
*G06K 9/36* (2006.01)
(52) U.S. Cl. .................... 382/246; 382/232
(58) Field of Classification Search ........... 382/232, 382/233, 246, 251; 341/59, 65, 67, 109; 375/240.23
See application file for complete search history.

(56) References Cited

U.S. PATENT DOCUMENTS 6,968,091 B2 * 11/2005 Faibish et al. ............... 382/251
7,469,011 B2 * 12/2008 Lin et al. ................... 375/240.23

* cited by examiner

*Primary Examiner* — Duy M Dang
(74) *Attorney, Agent, or Firm* — Thomas|Kayden

(57) ABSTRACT

A method for transcoding a first codeword to a second codeword, wherein both comprise escape codes and escape levels is disclosed. The method comprises receiving a bitstream to determine the first codeword therefrom, determining whether the first codeword belongs to a long escape mode or a short escape mode, and truncating the escape level of the first codeword to generate the second codeword when the first codeword belongs to the long escape mode. An embodiment of the first codeword is a Sorenson H.263 codeword and the second codeword is an H.263 codeword.

14 Claims, 9 Drawing Sheets

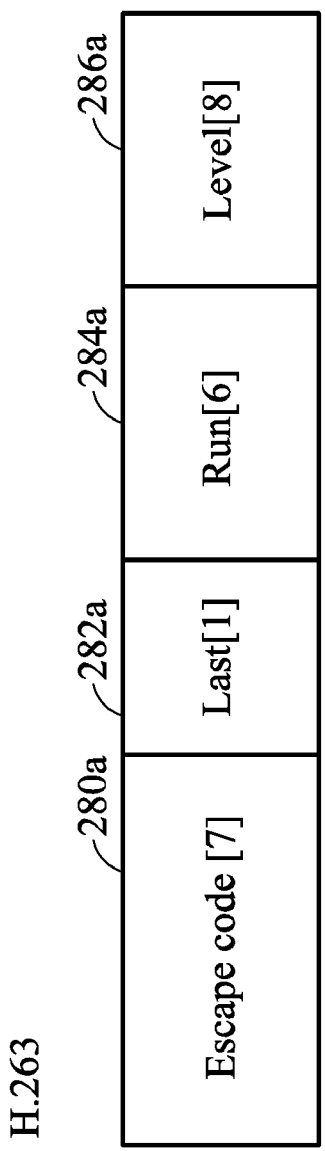
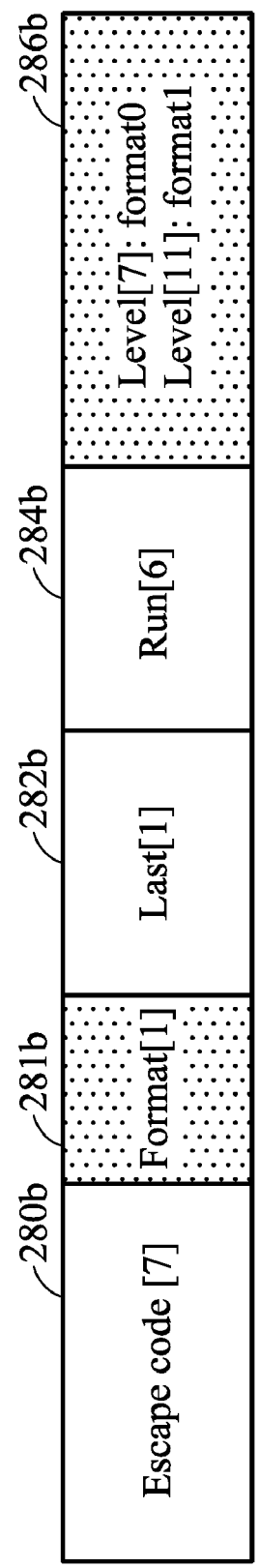

| Index | Level | Code |
|---|---|---|
| - | -128 | see trxt |
| 0 | -127 | 1000 0001 |
| . | . | . |
| 125 | -2 | 1111 1110 |
| 126 | -1 | 1111 1111 |
| - | 0 | FORBIDDEN |
| 127 | 1 | 0000 0001 |
| 128 | 2 | 0000 0010 |
| . | . | . |
| 253 | 127 | 0111 1111 |

FIG. 4

| 7-bit LEVELs | | |
|---|---|---|
| Index | Level | Code |
| - | -64 | FORBIDDEN |
| 0 | -63 | 1000 001 |
| . | . | . |
| 61 | -2 | 1111 110 |
| 62 | -1 | 1111 111 |
| - | 0 | FORBIDDEN |
| 63 | 1 | 0000 001 |
| 64 | 2 | 0000 010 |
| . | . | . |
| 125 | 63 | 0111 111 |

| 11-bit LEVELs | | |
|---|---|---|
| Index | Level | Code |
| - | -1024 | FORBIDDEN |
| 0 | -1023 | 1000 0000 001 |
| . | . | . |
| 1021 | -2 | 1111 1111 110 |
| 1022 | -1 | 1111 1111 111 |
| - | 0 | FORBIDDEN |
| 1023 | 1 | 0000 0000 001 |
| 1024 | 2 | 0000 0000 010 |
| . | . | . |
| 2045 | 1023 | 0111 1111 111 |

FIG. 5

TRANSCODING METHOD

BACKGROUND OF THE INVENTION

1. Field of the Invention

The invention relates in general to video coding, and in particular, to a transcoding method in video coding.

2. Description of the Related Art

Variable length coding (VLC) is commonly used in digital video compression, mapping source symbols to a variable number of bits. Video compression is typically carried out on a basis of a block, i.e., a group of pixels, e.g., 16×16, 16×8, 8×16, or 8×8 block. The compression scheme typically involves performing a transform function such as the discrete cosine transform (DCT) on a block to generate block coefficients, then quantizing the resultant block coefficients, scanning the quantized coefficients along a predefined order in the block to form a series of coefficients, and then statistically encoding the series of block coefficients using the VLC to generate VLC codewords for data transmission.

The series of block coefficients are grouped by a run of preceding zero amplitude coefficients, followed by a non-zero amplitude coefficient, wherein each group is referred to as a symbol. The symbols are statistically encoded using a variable length code such that the most frequently occurring symbol is encoded with the shortest codeword, and the less frequently occurring symbols are encoded with the longer codewords. For even less frequently occurring symbols, fixed-length codewords are deployed, and an escape code is attached at the beginning of each codeword to indicate the fixed-length codeword.

In video coding standards such as H.263, each symbol comprises 3 parameters for VLC generation, including LAST, a binary flag indicating whether or not the current symbol comprises the last non-zero coefficient in the block, RUN, a run-length of zero coefficients that precedes the current non-zero coefficient, and LEVEL, the current non-zero coefficient amplitude value. FIG. 1 shows a table used to generate the VLC codewords by the LAST, RUN, and LEVEL parameters. The video encoder receives a symbol comprising the LAST, RUN, and LEVEL parameters to look up the table of FIG. 1 to generate a variable number of run-length bitstream. The table shown in FIG. 1 comprises a number of lookup tables, each lookup table 10, 12, or 14 is indexed by LAST parameter, the video encoder finds a corresponding lookup table according to LAST parameter, and determines corresponding run-length codeword according to LEVEL and RUN parameters.

A number of video coding standards, such as the H.263 standard, have been specified and related video coding standards, such as the Sorenson H.263 by Sorenson and RMv2 by RealMedia, have been developed. Transcoding the video data from one format to another provides flexibility and reduces implementation costs as software or hardware of the video encoder for the different standards may be shared.

BRIEF SUMMARY OF THE INVENTION

A detailed description is given in the following embodiments with reference to the accompanying drawings.

A method for transcoding a first codeword to a second codeword, wherein both comprise escape codes and escape levels is disclosed. The method comprises receiving a bitstream to determine the first codeword therefrom, determining whether the first codeword belongs to a long escape mode or a short escape mode, and truncating the escape level of the first codeword to generate the second codeword when the first codeword belongs to the long escape mode. An embodiment of the first codeword is a Sorenson H.263 codeword and the second codeword is an H.263 codeword.

According to another aspect of the invention, another method for transcoding a first codeword to a second codeword is disclosed. The first codeword and second codeword comprise escape codes and escape levels. The method comprises receiving a bitstream to determine the first codeword therefrom, determining whether the first codeword belongs to a long escape mode or a short escape mode, decoding and de-quantizing the first codeword to produce block coefficients of an image block when the first codeword belongs to a long escape mode, and re-quantizing the block coefficients to generate a new escape level of the second codeword such that the new escape level is less than the maximal escape level of the second codeword.

BRIEF DESCRIPTION OF THE DRAWINGS

The invention can be more fully understood by reading the subsequent detailed description and examples with references made to the accompanying drawings, wherein:

FIGS. 3a and 3b show data formats of image blocks in FIGS. 2a and 2b.

FIG. 4 is a table comprising the escape levels and the corresponding binary codes complaint with the H.263 standard.

FIG. 5 is a table comprising the escape levels and the corresponding binary codes complaint with the Sorenson H.263.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

For explanatory purposes, the embodiments disclosed herein uses the Sorenson H.263 protocol to provide an example of an H.263-like protocol, other H.263-like protocols, such as an RMv2, can adopt the transcoding method by the same principles provided herein, with appropriate modifications. The transcoding method of the present invention can be implemented using hardware, software executing by processor, or a combination of hardware and software.

Figure 1:
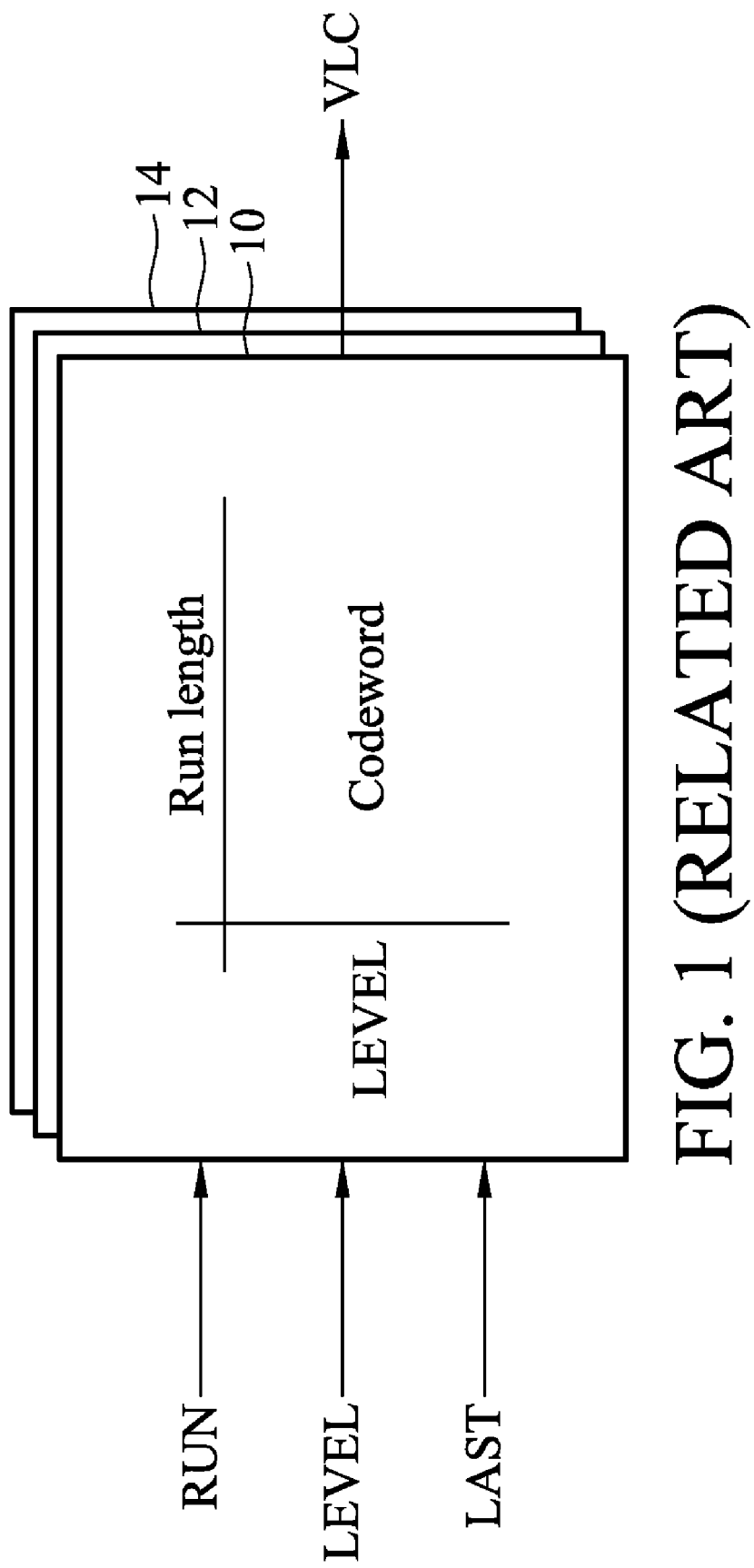
FIG. 1 shows a table used to generate VLC codewords by the LAST, RUN, and LEVEL parameters.
Figure 2A:
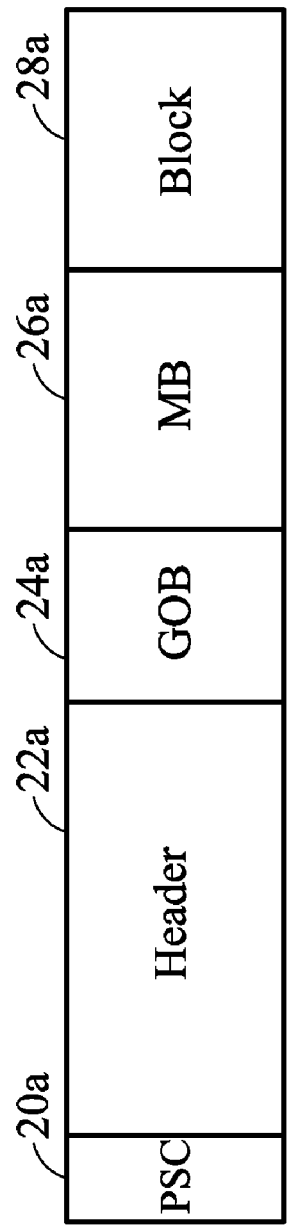
FIGS. 2a and 2b show data formats compliant with the H.263 and the Sorenson H.263 protocols respectively.
Figure 2B:
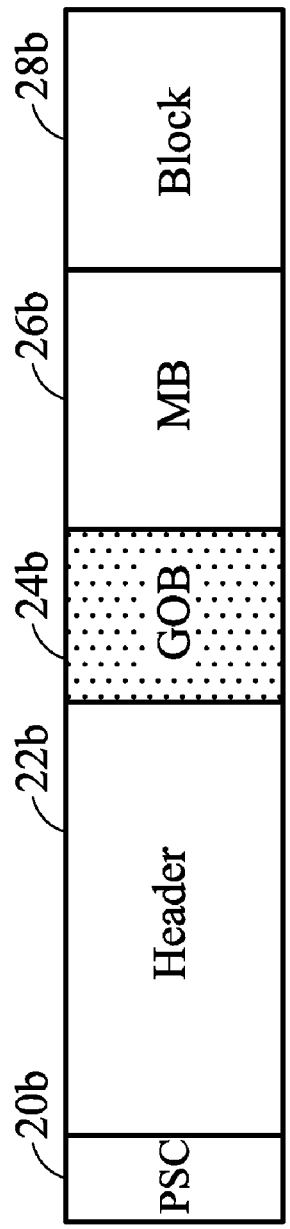

FIGS. 2a and 2b show data formats compliant with the H.263 and the Sorenson H.263 protocols respectively. An H.263 data codeword is coded into a hierarchical structure with four layers, picture layer, group of block (GOB) layer, macroblock (MB) layer, and block layer. The picture layer comprises a picture start code (PSC) 20a, a picture header 22a, and GOB data units each comprising a GOB header 24a and MB data units. Each of the MB data unit comprises an MB header 26a and block data 28a. A Sorenson H.263 data codeword has a similar data structure, which comprises a PSC 20b, a picture header 22b, a GOB header 24b, an MB header 26b, and block data 28b. A PSC contains a 20-bit known bit sequence for identifying the start of each data codeword. A GOB header contains Group of Block information, for example, a GOB with 16 rows. An MB header includes macroblock information, for example, an MB with 4 blocks. PSC, GOB header, and MB header segments are identical in H.263 and Sorenson H.263 data codewords. Picture header segments contain data packet information such as quantization size, frame width and height that are formatted differently in H.263 and Sorenson H.263 data codewords. The block data segments for carrying image data in each block of the MB are different in H.263 and Sorenson H.263. Thus, the method for transcoding the Sorenson H.263 data to an H.263 data according to an embodiment of the invention involves transcoding the picture header segments and image block segments from the Sorenson H.263 to the H.263 data format.

Specifically, block segments 28a and 28b differ in bit number and data information. FIGS. 3a and 3b show data formats of the image blocks 28a and 28b in FIGS. 2a and 2b respectively. Image block 28a and 28b both contain escape codes, last, run, and level parameters. In H.263, following quantization, a video encoder encodes the quantized block coefficients of the image block according to 1-bit last, 6-bit run, and 8-bit level parameters according to a VLC look-up table provided by a specific VLC scheme such as a Huffman coding or arithmetic coding scheme, to generate output bitstream made up of up to 22-bit patterns. When the video encoder is unable to find a mapping VLC codeword in the VLC look-up table, a fixed length 7-bit escape code is attached to the beginning of the H.263 codeword followed by the last, run, and level parameters, which is made up of a 22-bit codeword. The 8-bit escape level parameter is capable of representing the block coefficient from +127 to −127, FIG. 4 shows a table comprising the escape levels and the corresponding binary codes complaint with the H.263 standard. The most significant bit of the escape level code is a sign bit indicating the sign of the level code, with binary 1 representing a negative value and binary 0 representing a positive value.

In Sorenson H.263 data codewords, the data level can be encoded in long or a short escape mode, therefore a 1-bit format field is included to indicate the escape mode of the codeword. The long escape mode is represented by format 1 and employs an 11-bit level parameter, and the short escape mode is represented by format 0 and employs a 7-bit level parameter. The escape level in the long escape mode is capable of representing the block coefficient from +1023 to −1023, and in the short escape mode is capable of representing the block coefficient from +63 to −63. FIG. 5 shows a table comprising the escape levels and the corresponding binary codes complaint with the Sorenson H.263. The most significant bit of the escape level code is a sign bit indicating the sign of the level code, with binary 1 representing a negative value and binary 0 representing a positive value.

Since the level parameters in the Sorenson H.263 and the H.263 are in different bit lengths, exemplary transcoding methods according to the invention employ bit truncation or bit recoding to transcode the block segment from an H.263-like (Sorenson H.263) to an H.263 data.

Figure 6:
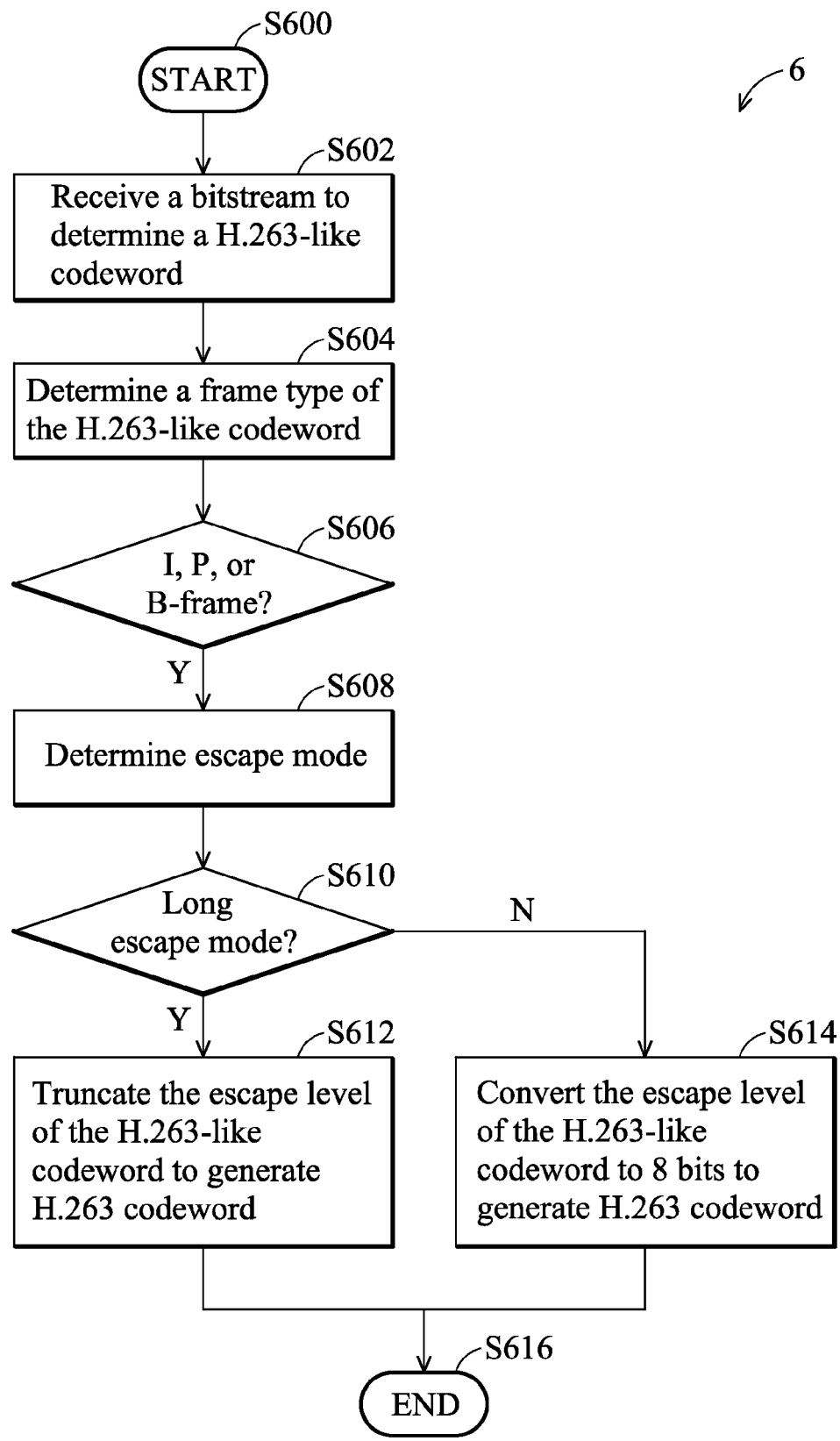
FIG. 6 is a flowchart of an exemplary transcoding method according to the invention for transcoding the block segment in FIGS. 2a and 2b.

FIG. 6 is a flowchart of an exemplary transcoding method according to the invention, transcoding the block segment in FIGS. 2a and 2b using bit truncation.

Upon start of the transcoding method (S600), an integrated circuit or a processor executing codes capable of transcoding an H.263-like codeword to an codeword receives a bitstream and determines the H.263-like codeword therefrom (S602). The H.263-like codeword may be a Sorenson H.263 or an RMv2. In the embodiment, the Sorenson H.263 data is used as an example of an H.263-like data to illustrate the operation of the transcoding method.

Next, in step S604, the IC or the processor determines the picture type of the H.263-like codeword according to PTYPE parameter in the header segment, as shown in FIG. 2b, and determines whether the picture type of the H.263-like codeword belongs to an I-frame, a P-frame or a B-frame (S606). Upon determination of the picture type, the method then goes to step S608. In the case of the Sorenson H.263 data, the determination of whether the picture type belongs to an I-frame, a P-frame or a B-frame may be implemented by determining whether the PTYPE parameter exceeds 0.

In step S608, the IC or processor determines the escape mode of the H.263-like codeword, and determines whether the escape mode is a long escape mode (S610). If the escape mode is the long escape mode, then step S612 is performed, if not, then step S614 is performed. In Sorenson H.263, the escape mode of a codeword may be one of short and long escape modes. For the short escape mode, the 7-bit escape level may be converted to an 8-bit escape level in the H.263 data format without data loss in step S614. For the long escape mode, the 11-bit escape level is truncated to an 8-bit escape level to comply with the H.263 standard requirement in step S612.

In step S612, the IC or processor truncates the escape level of the H.263-like codeword to generate the H.263 codeword when the H.263-like codeword belongs to the long escape mode. In Sorenson H.263, the long escape mode employs the 11-bit escape level to represent the value of the non-zero block coefficient, whereas in H.263, only the 8-bit escape level is used, thus 3 bits must be truncated to comply with the H.263 standard. When the 11-bit escape level represents a value within the range of plus or minus 127, no information is lost due to the transcoding by truncation. However, when the 11-bit escape level represents a value exceeding the range of plus or minus 127, the truncation to the 8-bit escape level loses the value information of the non-zero block coefficient. The implementation of the truncation may comprise determining an absolute value of the escape level of the H.263-like data, comparing the absolute value with a maximal escape level for the H.263 codeword, and truncating the escape level when the absolute value is less than the maximal escape level for the H.263 codeword. If the maximal escape level for the H.263 is 127, the truncation may comprise truncating 3 bits of the escape level from the least significant bit. The truncated escape level is used to generate the H.263 codeword. The escape code, and the run and last parameters remain the same in the block segment of the transcoded H.263 codeword.

In step S614, the IC or processor converts the escape levels from 7 bits to 8 bits without altering the value thereof when the H.263-like codeword type belongs to the short escape mode. In the case of a Sorenson H.263 data, the 7-bit escape level can be converted to an 8-bit escape level without information loss by inserting a binary 0 successive to the sign bit of the escape level data. The escape code, and the run and last parameters remain the same in the block segment of the transcoded H.263 codeword.

Upon completion of transcoding the H.263-like codeword to H.263 codeword, the method exits at step S616.

Figure 7:
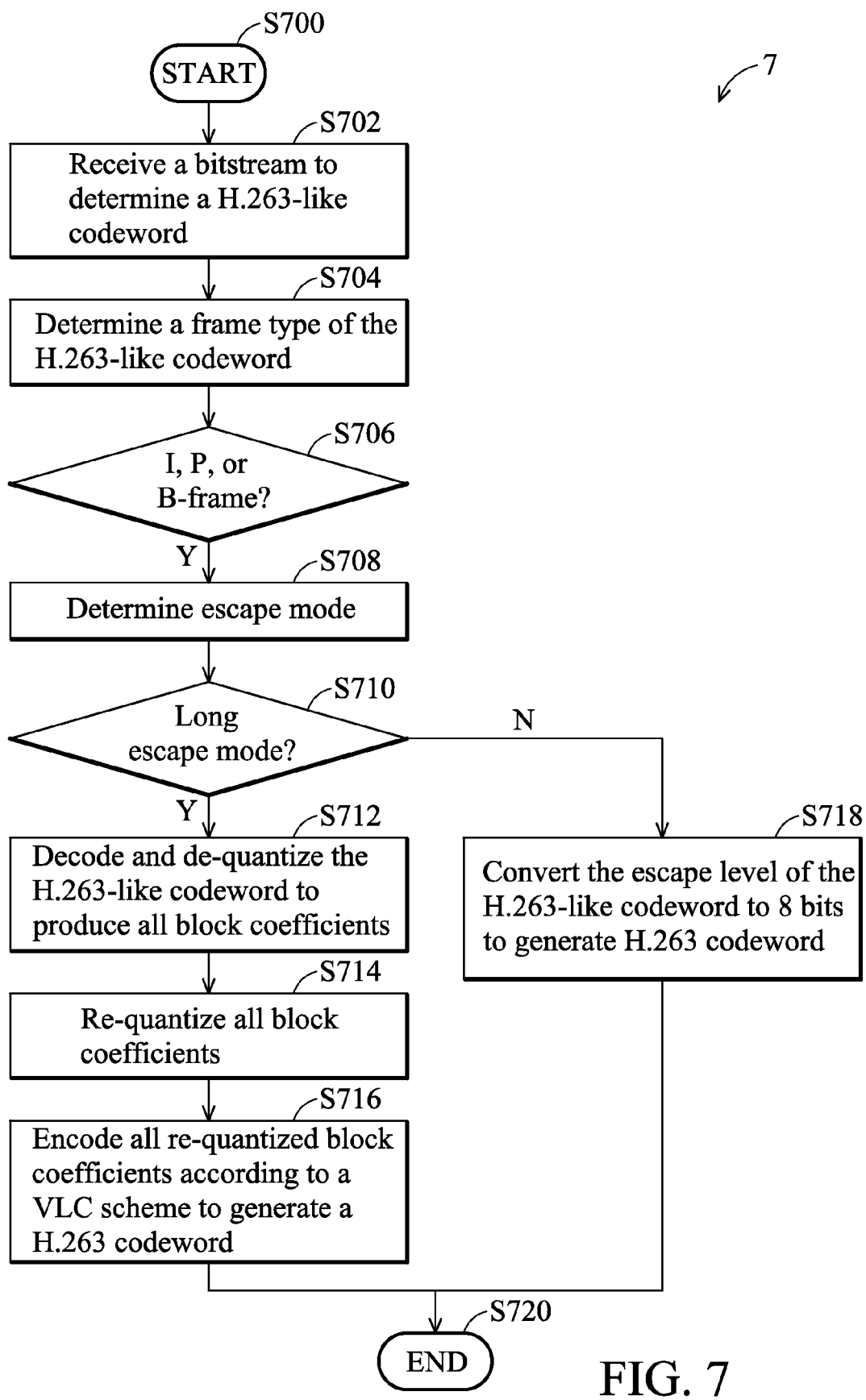
FIG. 7 is a flowchart of another exemplary transcoding method according to the invention for transcoding the block segment in FIGS. 2a and 2b.

FIG. 7 is a flowchart of another exemplary transcoding method according to the invention, transcoding the block segment in FIGS. 2a and 2b.

Since steps S700~S708 are identical to steps S600~S608 in FIG. 6, corresponding descriptions will not be repeated for brevity.

In step S710, the IC or processor determines whether the escape mode belongs to the long escape mode or short escape mode. If the escape mode belongs to the long escape mode, step S712 is performed, if the escape mode belongs to the short escape mode, than step S718 is performed.

In step S712, the IC or processor decodes and de-quantizes the H.263-like codeword to produce block coefficients of the image block when the H.263-like codeword belongs to a long escape mode. Next, the IC or processor re-quantizes the block coefficients to generate a new escape level of the H.263 codeword such that the new escape level is less than the maximal escape level of the H.263 codeword (S714), and encodes the re-quantized block coefficients according to a variable length coding (VLC) scheme to generate the H.263 codeword (S716). The VLC scheme may be a Huffman coding or arithmetic coding scheme. The maximal escape level of the H.263 codeword is 127 since there are 8 bits in the escape level of the H.263 codeword, and the most significant bit is used to indicate the sign. In some embodiments, there is an extra step after determining of a long escape mode, for checking whether the escape level exceeds a maximal escape level of the H. 263 codeword, and the IC or processor only decodes and de-quantizes the H.263-like codeword when the escape level exceeds the maximal escape level of the H.263 codeword, i.e., when an absolute of the escape level exceeds 127. In other embodiments, the IC or processor truncates the escape level of the H.263-like codeword to generate the H.263 codeword when the H.263-like codeword belongs to a long escape mode and the escape level of the H.263-like codeword is less than the maximal escape level of H.263 codeword, i.e., directly truncating the escape level to 8-bits when the escape level of the H.263-like codeword is within the range of ±127. The IC or processor re-quantizes the block coefficients using a quantization step size exceeding that in the de-quantizing step, for example, the re-quantization step size exceeds the quantization step size in the de-quantizing step by 2. The de-quantized quantization step size may be found in the PQUANT parameter in the header segment in FIG. 2b. The re-quantized block coefficients may be ordered along a specific two-dimensional path, e.g., along a zig-zag path for an 8×8 coefficient block to form a series of block coefficients for VLC coding. Since the H.263-like codeword is decoded, de-quantized, re-quantized and encoded to produce the H.263 codeword, the block segments of H.263-like codeword may appear differently from that of the H.263 data.

In step S718, the IC or processor converts the escape level to 8 bits to generate the H.263 codeword without altering the value thereof when the H.263-like codeword type belongs to the short escape mode. Since the escape level of the Sorenson H.263 data is 7 bits, conversion to 8 bits does not suffer information loss, the escape code and the run and last parameters remain the same in the transcoded H.263 data packet.

Upon completion of transcoding the H.263-like codeword to the H.263 codeword, the method exits at step S720.

Figure 8:
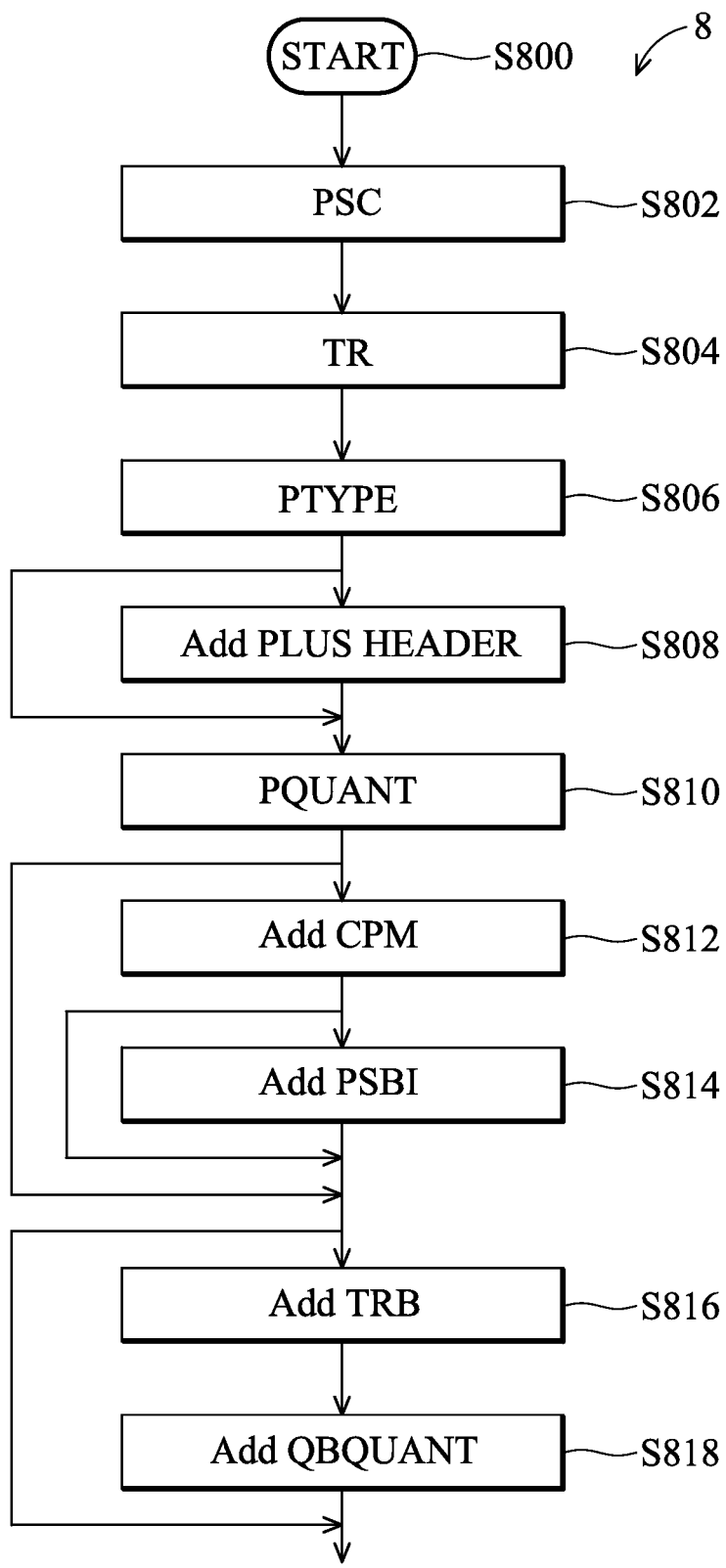
FIG. 8 is a flowchart of yet another exemplary transcoding method according to the invention for transcoding the header segment in FIGS. 2a and 2b.

FIG. 8 is a flowchart of yet another exemplary transcoding method according to the invention, transcoding the picture header segment in FIGS. 2a and 2b.

The header segments of the H.263 data and H.263-like data are different, thus it is required to transcode the header to an appropriate format.

Upon the beginning of header transcoding (S800), the IC or processor converts a 17-bit picture start code and a 5-bit version parameter to a 22-bit picture start code compliant with an H.263 (S802), copies 8-bit TR parameters, and converts PTYPE parameters including a 3-bit picture size, width, height, 2-bit picture type, and 1-bit deblocking parameters to a 13-bit picture type parameters for the H.263 data. The width and height parameters may represent 0, 8, or 16 pixels.

Next, the IC or processor add PLUS HEADER parameters (S808), copies PQUANT parameter for the quantization step size of the quantized coefficients in the image block (S810), and adds parameters CPM, PSBI, TRB, and QBQUANT (S812~818) to the header segments to generate the header segment for the H.263 data.

Figure 9:
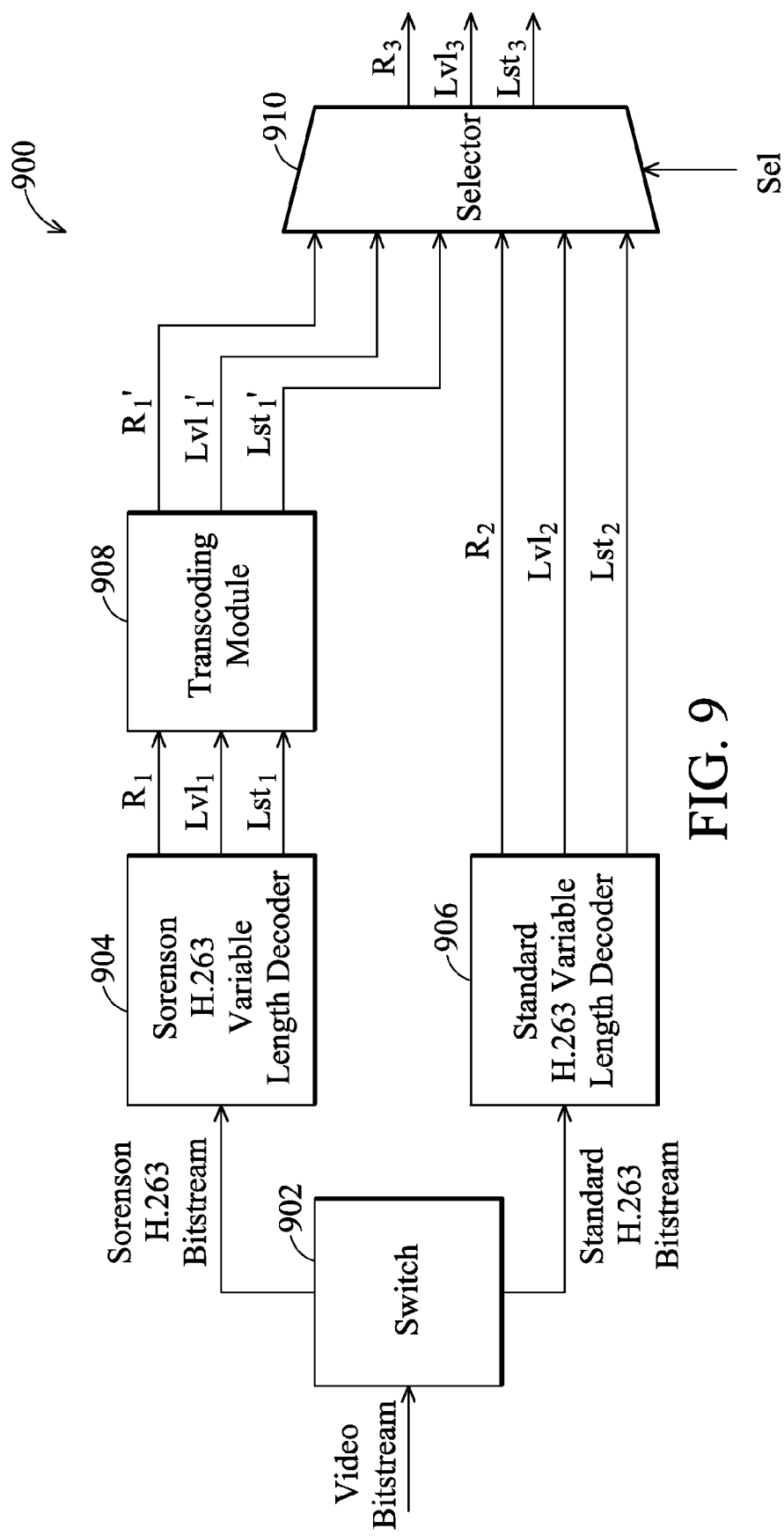
FIG. 9 is a block diagram of a video processing circuit according to the invention.

The transcoding methods disclosed in FIGS. 6 and 7 are also applicable to hardware circuits. Referring to FIG. 9, a block diagram of a video processing circuit 900 according to the invention is shown. The video processing circuit 900 can process a video bitstream encoded according to a standard H.263 protocol or a Sorenson H.263 protocol. In one embodiment, the video processing circuit 900 comprises a switch 902, a Sorenson H.263 variable length decoder 904, a standard H.263 variable length decoder 906, a transcoding module 908, and a selector 910. When the video processing circuit 900 receives a video bitstream, the switch 902 first determines whether the video bitstream is encoded according to a standard H.263 protocol or a Sorenson H.263 protocol. If the video bitstream is encoded according to a standard H.263 protocol, the video bitstream is delivered to the standard H.263 VLD 906, and the standard H.263 VLD 906 decodes the video bitstream to obtain standard H.263 codewords comprising run values $R_2$, level values $Lvl_2$, and last values $Lst_2$.

Otherwise, when the video bitstream is encoded according to a Sorenson H.263 protocol, the video bitstream is delivered to the Sorenson H.263 VLD 904, and the Sorenson H.263 VLD 904 decodes the video bitstream to obtain Sorenson H.263 codewords comprising run values $R_1$, level values $Lvl_1$, and last values $Lst_1$. The transcoding module 908 then performs a transcoding process to convert the Sorenson H.263 codewords to standard H.263 codewords comprising run values $R_1'$, level values $Lvl_1'$, and last values $Lst_1'$ according to the transcoding methods 6 and 7 shown in FIGS. 6 and 7. For example, when a Sorenson H.263 codeword has a long escape mode, the transcoding module 908 truncates the escape level of the Sorenson H.263 codeword to obtain a standard H.263 codeword (step S612). When the Sorenson H.263 codeword has a short escape mode, the transcoding module 908 converts the escape level of the Sorenson H.263 codeword to 8 bits to obtain a standard H.263 codeword (step S614). The selector 910 then outputs the standard H.623 codewords generated by the transcoding module 908 or the standard H.623 VLD 906 according to a selection signal Sel. Thus, the video processing circuit 900 decodes a video bitstream of either a Sorenson H.263 format or a standard H.263 format to obtain standard H.263 codewords.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for transcoding a first codeword to a second codeword, wherein both comprise escape codes and escape levels, and the method comprising:

receiving a bitstream to determine the first codeword therefrom;

determining whether the first codeword belongs to a long escape mode or a short escape mode; and truncating the escape level of the first codeword to generate the second codeword when the first codeword belongs to the long escape mode.

2. The method of claim 1, further comprising converting the escape levels from 7 to 8 bits without altering the value thereof when the first codeword type belongs to the short escape mode.

3. The method of claim 1, wherein the truncation step comprises:
    determining an absolute value of the escape level of the first data;
    comparing the absolute value with a maximal escape level for the second codeword; and
    truncating the escape level when the absolute value is less than the maximal escape level for the second codeword.

4. The method of claim 1, wherein the first codeword is a Sorenson H.263 codeword, and the second codeword is an H.263 codeword.

5. The method of claim 4, wherein the truncation step comprises truncating 3 bits off from the escape level of the Sorenson H.263 codeword.

6. The method of claim 1, further comprising:
    receiving a first codeword to determine a picture type thereof,
    wherein the determination of whether the first codeword belongs to the long or a short escape mode comprises:
    determining whether the first codeword belongs to a long escape mode or a short escape mode when the picture type is an I-frame, a P-frame or a B-frame.

7. A method of transcoding a first codeword to a second codeword, wherein both comprise escape codes and escape levels, and the method comprising:
    receiving a bitstream to determine the first codeword therefrom;
    determining whether the first codeword belongs to a long escape mode or a short escape mode;
    decoding and de-quantizing the first codeword to produce block coefficients of an image block when the first codeword belongs to a long escape mode; and
    re-quantizing the block coefficients to generate a new escape level of the second codeword such that the new escape level is less than the maximal escape level of the second codeword.

8. The method of claim 7, further comprising encoding the re-quantized block coefficients according to a variable length coding (VLC) scheme to generate the second codeword.

9. The method of claim 7, wherein the re-quantizing step comprises re-quantizing the block coefficients using a quantization step size exceeding that in the de-quantizing step.

10. The method of claim 7, wherein the decoding and de-quantizing step comprises decoding and de-quantizing the first codeword only when the escape level exceeds the maximal escape level of second codeword.

11. The method of claim 7, further comprising truncating the escape level of the first codeword to generate the second codeword when the first codeword belongs to a long escape mode and the escape level of the first codeword is less than the maximal escape level of second codeword.

12. The method of claim 7, further comprising converting the escape levels from 7 to 8 bits without altering the value thereof when the first codeword type belongs to the short escape mode.

13. The method of claim 7, wherein the first codeword is a Sorenson H.263 codeword and the second codeword is an H.263 codeword.

14. The method of claim 7, further comprising:
    determine a picture type of the first codeword,
    wherein the determination of whether the first codeword belongs to the long or a short escape mode comprises:
    determining whether the first codeword belongs to a long escape mode or a short escape mode when the picture type is an I-frame, a P-frame or a B-frame.

* * * * *